June 10, 1952 C. E. PEGG 2,599,719
GRINDING MILL
Filed March 15, 1949
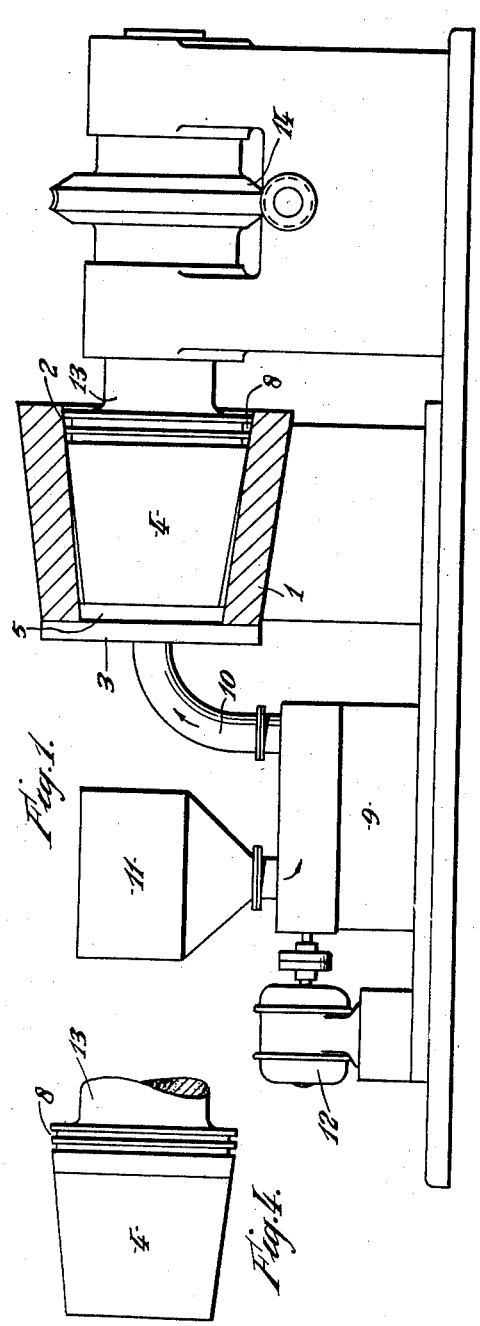
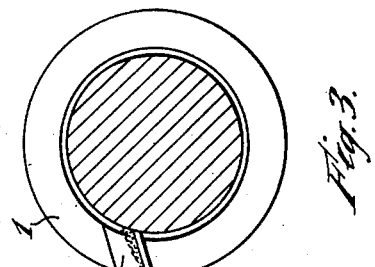
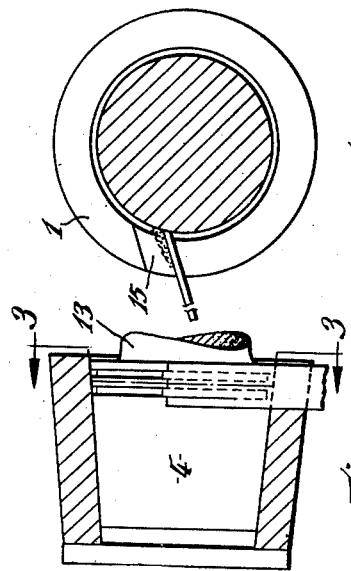
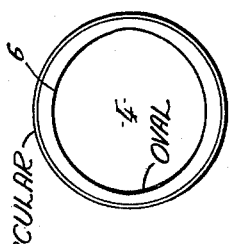

Patented June 10, 1952

2,599,719

UNITED STATES PATENT OFFICE 2,599,719

GRINDING MILL

Charles Edward Pegg, Bristol, England, assignor to E. S. & A. Robinson, Limited, Bristol, England, a British corporation Application March 15, 1949, Serial No. 81,479
In Great Britain March 19, 1948

3 Claims. (Cl. 241—245)

This invention relates to grinding mills and is particularly suitable for grinding materials such as dye-stuff pigment, or powdered material to be mixed with liquid, vehicles, or other wetting agents to form a paste.

The method of grinding according to this invention consists in introducing the material to be ground under pressure into a space of decreasing volume and preferably between surfaces which move relatively to each other.

Apparatus according to the invention comprises a fixed casing having one end open and a member adapted to rotate therein, the material to be ground being introduced between the casing and the rotating member. Preferably the rotating member has not a close fit with the inside surface of the casing over the whole surface so that the material to be ground is gradually introduced from a wider space to a narrower space.

The invention is illustrated in the accompanying drawings, wherein:

Fig. 1 is a side elevation of the rotary grinding mill, the casing of the grinding member being shown partly in section, and the rotor being shown as viewed at a right angle to the rotor shown in Fig. 2;

Fig. 2 is a part sectional side elevation of the casing and an elevation of the rotary grinding member of the mill;

Fig. 3 is a cross-section taken along the line 3—3 of Fig. 2;

Fig. 4 is a side elevation of the rotatable member;

Fig. 5 is an end view of the member shown in Fig. 4 as viewed from the left end thereof.

Referring to the drawings the fixed casing 1 is frustoconical and arranged with its axis horizontal, the open end 2 being slightly greater in diameter than the closed end 3. A frustoconical member 4 of substantially similar shape fits into the fixed casing 1 and means are provided for rotating the said member. The material to be treated is pumped in to the closed end 3 of the casing. The end of the member 4 is spaced from the closed end 3 of the casing to provide a chamber 5.

The rotating member 4 has a portion or portions of its length concentrically ground to form a bearing and also a partial seal between it and the casing 1. The remaining portion of the rotating member is ground out of true concentricity with the axis as shown at 6 (Fig. 5) to give it a slightly oval cross-section. The object of the oval cross-section is to produce a crushing and rubbing action to any material which is forced into the spaces so formed between the rotating member and the fixed casing.

The larger end of the rotating member is concentrically ground to fit the inside of the casing 1 and is provided with a plurality of annular grooves 8 in which the material to be treated is collected after being ground. The rotating member 4 is arranged so as to be easily withdrawn for the purpose of cleaning and if desired the casing 1 may be resiliently mounted for self alignment.

The rotating member 4 may be solid, or hollow and either the said rotating member 4 or the casing 1, or both, may be provided with water cooling means.

In use the material to be ground, for example, varnish dye-stuff pigments or chocolate and the like in the form of a paste, are pumped under pressure into the space 5 between the closed end 3 of the casing and the member 4 by the pump 9 through a pipe 10 from a hopper 11. A motor 12 operates the pump 9. The material is forced into the spaces between the casing 1 and the rotating member 4 which are formed by the irregular cross-section of the latter.

The member 4 is formed integrally with the shaft 13 which is rotated by the gears 14. The continual feeding under pressure of raw materials into the closed end 3 of the casing forces the particles along the length of the grinding surface and into a decreasing space by reason of the longitudinally tapered formation of the irregularly ground portion of the rotating member.

Finally the ground material is forced into the adjustably restricted space between the rotating member and the casing and collects in the annular grooves 8 in the rotating member 4.

The ground material is then scraped out of these grooves in the concentrically ground portion of the rotating member by means of a scraper through a cut-away portion 15 of the casing 1.

The rotating member will normally have a purely rotary motion but if desired may have an oscillating motion added to give a still further grinding action between it and the cylinder.

What I claim and desire to secure by Letters Patent is:

1. A grinding mill comprising a hollow frustoconical stationary casing, a substantially frustoconical member disposed within the stationary casing in the same sense and rotatable therein, the small end of the rotatable member being spaced from the corresponding end of the casing and providing a charging chamber, means for introducing and maintaining under pressure material to be ground between the casing and the rotatable member, the rotatable member being oval in cross-section at the charging end and having a major diameter thereat substantially equal to the internal diameter of the casing and the oval surface of the rotatable member progressively changing from its charging end to its discharge end from an oval to a circle of substantially the same internal diameter of the casing at said discharge end.

2. A grinding mill according to claim 1 wherein the large end of the rotatable member is formed with a peripheral groove for collecting the material being acted upon by the grinding elements of the mill.

3. A grinding mill according to claim 2 wherein the casing is formed with an opening in its wall overlying the material-collecting groove in the rotatable member, through which opening the ground material may be removed from the groove.

CHARLES EDWARD PEGG.

REFERENCES CITED

The following references are of record in the file of this patent:

UNITED STATES PATENTS

| Number | Name | Date |
|---|---|---|
| 12,707 | Paynter | Apr. 10, 1855 |
| 506,578 | Anderson | Oct. 10, 1893 |
| 940,944 | Shepard | Nov. 23, 1909 |
| 1,301,637 | Bair | Apr. 22, 1919 |
| 1,486,352 | Manson | May 11, 1924 |
| 1,851,071 | Travis | Mar. 29, 1932 |
| 1,885,283 | Ostermann | Nov. 1, 1932 |
| 1,988,743 | MacKensie | Jan. 22, 1935 |
| 2,231,421 | Gitzendanner | Feb. 11, 1941 |
| 2,309,376 | Avery | Jan. 26, 1943 |
| 2,338,198 | Pall | Jan. 4, 1944 |
| 2,362,035 | Sullivan | Nov. 7, 1944 |

FOREIGN PATENTS

| Number | Country | Date |
|---|---|---|
| 303,568 | Great Britain | Jan. 10, 1929 |